(No Model.)

J. NEIMEYER.
SHEARS.

No. 546,493. Patented Sept. 17, 1895.

Witnesses,
J. J. Richardson
H. A. Gray.

John Neimeyer, Inventor.
By Robert S. Carr, Att'y.

UNITED STATES PATENT OFFICE.

JOHN NEIMEYER, OF TRENTON, OHIO.

SHEARS.

SPECIFICATION forming part of Letters Patent No. 546,493, dated September 17, 1895.

Application filed February 25, 1895. Serial No. 539,546. (No model.)

*To all whom it may concern:*

Be it known that I, JOHN NEIMEYER, a citizen of the United States, residing at Trenton, in the county of Butler and State of Ohio, have invented certain new and useful Improvements in Shears, of which the following is a specification.

My invention relates to that class of shears of the ordinary kind and used for cutting paper, textile fabrics, &c.; and the object of my improvement is to provide a clamping-yoke to exert a yielding pressure on the blades at the pivot of the shears, whereby the pressure of the cutting-edges upon each other is maintained constant throughout their length. This object is attained in the following-described manner, as illustrated in the accompanying drawings, in which—

Figure 2:
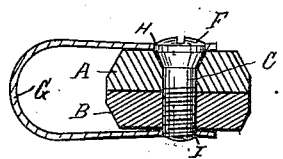
Figure 1:
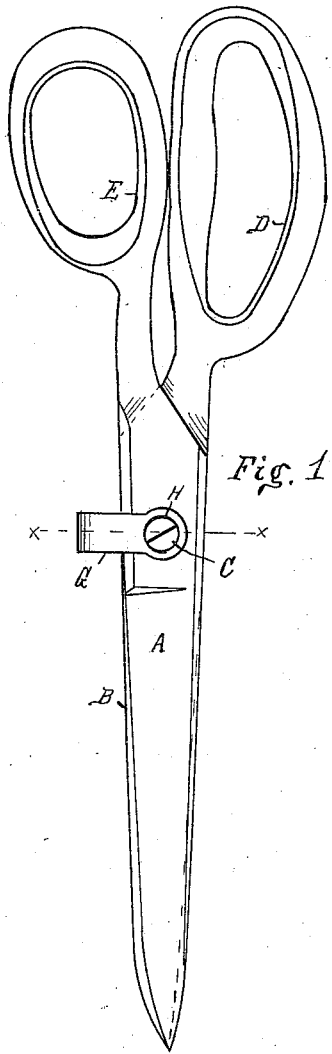

Figure 1 is a plan of a pair of shears embodying my improvement; Fig. 2, an enlarged sectional view on the line $x\,x$ of Fig. 1.

In the drawings, A and B represent the blades of a pair of shears of the usual construction, and C the screw that pivotally connects the blades together. Said blades are formed with the usual cutting-edges on one side of the pivot and terminate in the opposite direction in handles D and E, of the usual form. Screw C is threaded and firmly secured in blade B and forms a pivot whereon blade A is freely movable, while it is retained in place on blade B by the enlarged screw-head F.

Yoke G resembles a horseshoe in shape, and is formed of spring-steel or other resilient metal. Its sides are of equal length and slightly converge toward each other from the central bend until they terminate at a somewhat less distance apart than the thickness of the shears where the pivot-screw is inserted. The extremities of the yoke contain perforations H and I, respectively, to receive the ends of screw C, that usually project beyond opposite sides of the shears, and whereon the yoke is swiveled and retained in place on the shears by means of its clamping tendency. The length of the yoke is sufficient to avoid any interference with the opening movement of the shears. The clamping exertion of the yoke yields during the closing movement of the shears to compensate for the increasing pressure of the cutting-edges of the blades against each other. In this manner the pressure of the blades against each other at the point of contact of the edges is maintained substantially constant during the entire length of the cut. The relative position of the blades at the point of contact of the edges is invariable to avoid injury to the cutting-edges, that so frequently occurs in shears when the blades become too loose on the pivot.

To the extent of the foregoing description the yoke is attachable to any ordinary shears to remedy the looseness of the movable blade on the pivot-screw and to make them more efficient than by any adjustment of the screw.

Having fully described my improvement, what I claim as my invention, and desire to secure by Letters Patent, is—

1. In a pair of shears, the combination with a headed pivot screw being secured in one of the blades and whereon the other blade is movable, the head of the screw being projected without the surface of the movable blade, and without exerting any pressure thereon, of a U shaped clamping yoke containing a perforation through one of its ends to movably and detachably engage with the head of the screw, said yoke being attachable in a transverse position to embrace the jaws of the shears, and adapted to exert a yielding clamping pressure on the shear blades, for the purpose specified.

2. In a pair of shears, the combination with the blades and the pivot therefor, said pivot being adjustable through the blades to project its point more or less from one blade and its head from the other blade without permitting the head to clamp the blades together, of a U shaped yoke to clamp the blades between its jaws, one jaw thereof being perforated to encircle the screw head and to permit it to exert a yielding pressure on the contiguous blade while the opposite jaw presses on the point of the screw without the other blade, and whereby the tension of the yoke may be changed by adjusting the screw.

JOHN NEIMEYER.

Witnesses:
ROBERT S. CARR,
C. I. PARRISH.